United States Patent Office 2,801,932
Patented Aug. 6, 1957

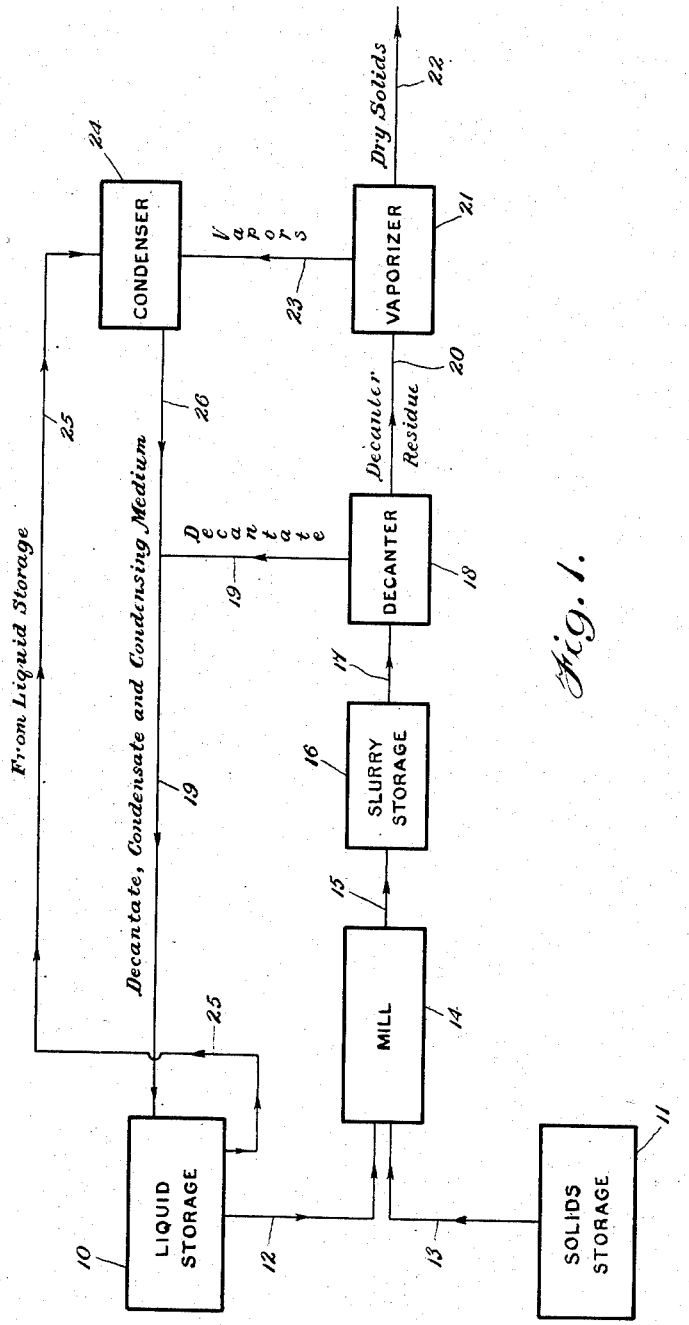

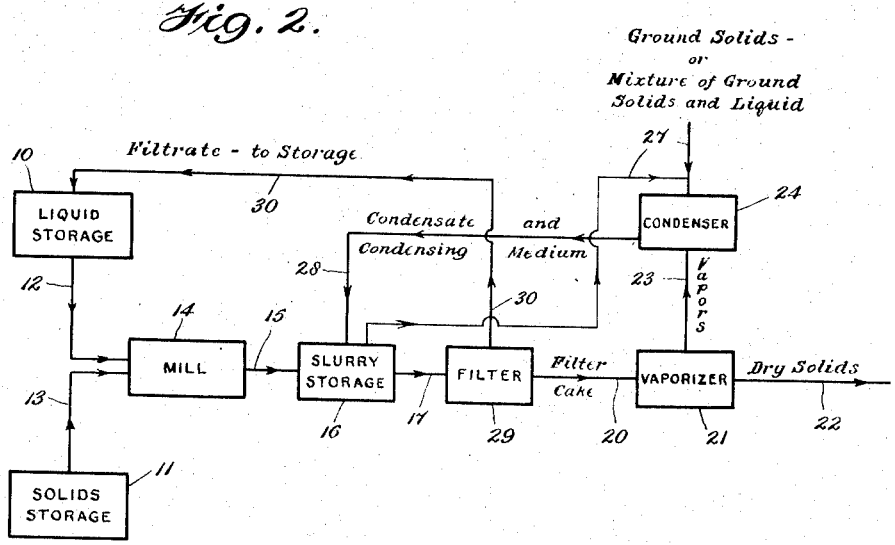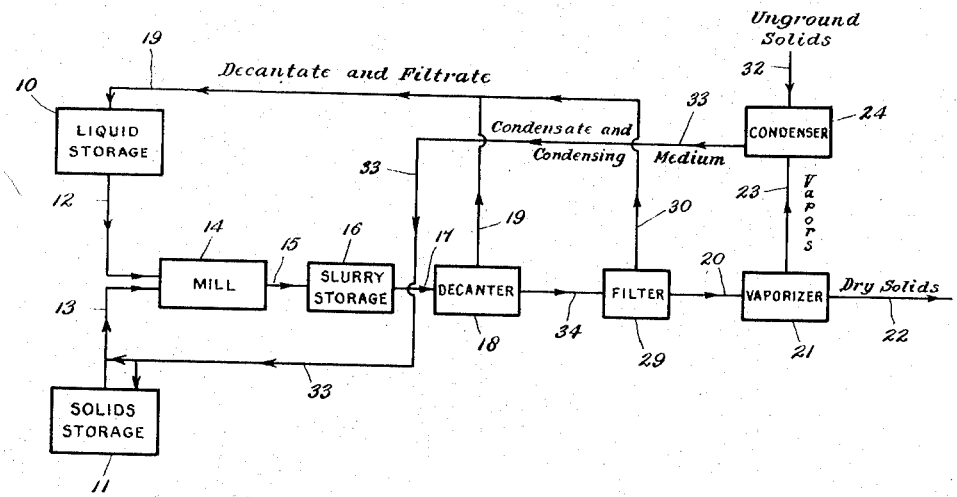

2,801,932

METHOD OF AND APPARATUS FOR THE WET GRINDING OF SOLIDS

Joshua Chitwood Witt, Chicago, Ill.

Application September 27, 1954, Serial No. 458,447

12 Claims. (Cl. 106—100)

This invention relates to the disintegration or comminution of solids, and has for its principal object the provision of an improved and more economical method of and apparatus for wet grinding solid materials such as are employed, for example, in the making of hydraulic cement, the preparation of paint pigments, etc.

Under a method heretofore devised by me for the reduction of Portland cement-making and analogous solids the use of water, which theretofore had been the liquid commonly employed in the wet grinding of such solids, is eliminated with resultant substantial lowering of subsequent heat requirements, and other benefits; and the present invention represents a further development of that general idea whereby additional economies may be effected.

Briefly, said prior method comprises the grinding of the solids in the presence of a non-aqueous liquid thereby producing a slurry composed of from 60% to 70% of finely divided solids and 40% to 30% of such liquid; and the recovery of the liquid from the slurry for re-use, as by decantation, filtration, centrifuging and/or distillation. In the case of Portland cement the separated solids are then clinkered and ground, while in other fields they may be processed in such other manners as are required by their ultimate use. The recovery and re-use of the non-aqueous liquid is desirable by reason of the fact that in and of itself it is more expensive than water, although because of the reduced heat requirements resulting from its use the process as a whole is appreciably more economical than when water is employed as the grinding liquid.

The present invention has to do primarily with the recovery of the liquid employed in a wet grinding operation of the character above mentioned. In the prior method above referred to it was contemplated that if distillation were employed to recover some or all of the liquid, the vapors would be condensed in conventional manners and apparatus; however, it has now been determined that the initial cost of equipment as well as the costs of maintenance and operation may be substantially reduced if the raw solids or the raw liquid used in the grinding, or both, be utilized to effect the condensation of the vapors volatilized from the slurry.

Essentially therefore, the present method comprises the reduction of the raw solids in any appropriate grinding mill in the presence of a non-aqueous liquid to produce a slurry; and recovery for re-use of some or all of the liquid constituent of such slurry by vaporization thereof and condensation of the vapors by bringing them into direct contact with (a) portions of the raw liquid employed in the process; or (b) with portions of the raw solids; or (c) with a mixture of the raw solids and liquid. In some cases the recovery of all of the liquid content of the slurry may be accomplished by distillation as just outlined, while in other instances as much of the liquid as is practical may be first separated mechanically from the slurry solids by decantation, filtration and the like, in order to keep the heat requirements for the distillation as low as feasible.

For purposes of clear disclosure the invention has been illustrated in the accompanying drawings constituting a part of this specification, in which like elements are designated by like reference characters throughout the views, and in which:

Figure 1 is a diagrammatic layout of the various pieces of apparatus and the connections between them employed when portions of the raw grinding liquid are utilized for condensing purposes, with the flow of the materials being indicated by arrows;

Fig. 2 is a like view of an arrangement adapted for the use of dry ground portions of the solids alone, or a mixture of such ground solids and portions of the liquid; and Fig. 3 is a similar view of an arrangement adapted to utilize portions of the raw unground solids.

Referring first to Fig. 1, 10 designates a suitable tank or receptacle for storing a supply of the raw liquid employed in the method, such as the non-aqueous grinding liquid mentioned above, and 11 is a similar storage receptacle for the solids to be ground. The respective materials are transferred from these receptacles in regulated quantities, by connections indicated by the lines 12 and 13, to an appropriate mill 14 wherein the solids are ground in the presence of the liquid to produce a slurry, which is transferred by connections designated 15 to a slurry storage tank or receptacle 16. The slurry is withdrawn from this receptacle as needed and transferred, as indicated by the line 17, to a suitable decanter 18 from which the decanted liquid is returned to the raw liquid storage tank 10 through connections indicated by the line 19.

The residue from the decanter 18 is transferred, as indicated by the line 20, to a vaporizer 21 in which such material is supplied with heat units, from any convenient source, sufficient to substantially completely vaporize all of the liquid remaining with the solids. The thus dried solids are removed from the heater, as indicated by the line 22, for transfer to the kilns or such other treatment as may be required by the ultimate use to which they are to be put. The vapors resulting from the heating of the decanter residue in vaporizer 21 are conducted, as indicated by line 23, to a condenser unit 24 in which such vapors are bubbled through or otherwise brought into direct contact with some of the raw grinding liquid, which may be supplied to said condenser by connections indicated by the line 25. The raw liquid, being at normal temperature, serves as a condensing medium for the vapors, and as they again become liquid they intermingle with the condensing medium, which is withdrawn from the unit 24 and transferred, by connections indicated by the line 26, and a portion of line 19, to the liquid storage tank 10.

In Fig. 2, wherein ground portions of the solids, or a mixture of such ground solids and the raw grinding liquid (which mixture may be a portion of the slurry itself), are supplied to the condenser 24 by connections 27 for employment as the condensing medium, the general arrangement of the apparatus is the same as in Fig. 1 except that the condensing medium and the vapors condensed thereby are transferred from the unit 24 to the slurry storage tank 16 through connections indicated by the line 28. In this figure a filter 29 has been shown in the place of the decanter 18 of Fig. 1, with the filtrate therefrom being returned to the liquid storage receptacle 10 by connections indicated at 30. The specific structure of the condenser unit 24 of course may vary according to the condensing medium employed.

In Fig. 3 the general arrangement again is similar but unground solids, which may be supplied to the condensing unit 24 from storage by means of connections 32, are employed as the condensing medium and as they become wetted or saturated with the condensed vapors they are transferred from the condenser by connections indicated at 33, either to the solids storage bin or directly to the mill 14. In this case both a decanter 18 and a filter 29 are shown in the circuit, being connected in series by connections 34; however, either may be employed alone, as in the preceding figures. Furthermore, in any case where, as above mentioned, recovery of all of the slurry liquid by distillation is contemplated, these mechanical separating units may be omitted entirely.

The various pieces of apparatus referred to above may be of conventional constructions well known to those skilled in the art and as their details may vary according to particular conditions and/or the preferences of the builder or user, and constitute no part of the present invention, no specific constructions thereof have been illustrated. Likewise, the connections between the several pieces of apparatus have been indicated merely diagrammatically, although those which effect transfer of fluid components ordinarily will be pipes or similar conduits provided with appropriate valves where necessary for controlling the flow therein, and pumps if necessary to effect or maintain such flow. The means for transferring the solids may be chutes, power driven conveyers and the like, depending upon the distance and/or direction of transfer.

By mechanical separation, as herein used, is meant separation of the liquid from the solids by decantation, filtration, centrifuging, etc., as distinguished from vaporization of the liquid and condensation of the vapors.

What is claimed is:

1. In the wet grinding of cement-making, pigment-making and analogous solids, the method which comprises subjecting the solids to a grinding action in the presence of a liquid which it is desired to recover, thereby producing a mixture composed of ground solids and such liquid; heating said mixture to vaporize the liquid content thereof and dry the ground solids for further processing; bringing the vapors resulting from said heating into contact with a condensing medium comprising portions of a raw constituent of the mixture, whereby to condense said vapors; and transferring the condensing medium and condensate to storage for re-use in the process.

2. In the wet grinding of cement-making, pigment-making and analogous solids, the method which comprises subjecting the solids to a grinding action in the presence of a liquid which it is desired to recover, thereby producing a slurry composed of ground solids and such liquid; mechanically separating a portion of the slurry liquid from the ground solids and returning such separated liquid to storage; heating the remaining portions of the slurry to vaporize substantially all of the liquid content thereof and dry the solids for further processing; bringing the vapors produced by said heating into direct contact with a condensing medium comprising portions of at least one of the raw constituents of the slurry, whereby to condense said vapors and intermingle the condensate with said medium; and transferring the mixture of condensate and condensing medium to storage for re-use in the process.

3. The method set forth in claim 2, wherein the condensing medium comprises portions of the raw liquid constituent of the slurry.

4. The method set forth in claim 2, wherein the condensing medium comprises portions of the raw solids constituent of the slurry.

5. The method set forth in claim 2, wherein the condensing medium comprises a mixture of portions of the raw solids and liquid materials.

6. The method set forth in claim 2, wherein the condensing medium comprises ground portions of the raw solids.

7. The method set forth in claim 2, wherein the condensing medium comprises unground portions of the raw solids.

8. The method set forth in claim 2, wherein the condensing medium comprises ground portions of the raw solids mixed with portions of the raw liquid, and the condensate and condensing medium are returned to the slurry ahead of the mechanical separation of the components of the latter.

9. Apparatus for the wet grinding of cement-making and analogous solids, comprising storage receptacles respectively for the raw solids and for a grinding liquid which it is desired to recover and re-use; a mill having connections with said storage receptacles for transfer of materials from the latter to the mill for grinding of the solids therein in the presence of the liquid to produce a slurry; a storage receptacle receiving said slurry from the mill; means for receiving slurry from such storage receptacle, separating a portion of the liquid content thereof from the ground solids and returning the separated liquid to the raw liquid storage receptacle; means for receiving the residue of the slurry from the separating means and heating it to vaporize the remaining liquid and dry the solids for further processing; condensing means connected to said heating means for receiving the vapors therefrom; means for supplying portions of a raw constituent of the slurry to said condensing means for direct condensing contact with the vapors therein; and means connecting said condensing means with one of said storage receptacles for transferring the condensate and condensing medium from the former to the latter.

10. Apparatus for the wet grinding of cement-making and analogous solids, comprising storage receptacles respectively for the raw solids and for a grinding liquid which it is desired to recover and re-use; a mill having connections with said storage receptacles for transfer of materials from the latter to the mill for grinding of the solids therein in the presence of the liquid to produce a slurry; a storage receptacle receiving said slurry from the mill; means for receiving slurry from such storage receptacle, separating a portion of the liquid content thereof from the ground solids, and returning the separated liquid to the raw liquid storage receptacle; means for receiving the residue of the slurry from the separating means and heating it to vaporize the remaining liquid and dry the solids for further processing; condensing means connected to said heating means for receiving the vapors therefrom; means for supplying portions of the raw grinding liquid to said condensing means for direct condensing contact with the vapors therein; and means connecting said condensing means with the raw liquid storage receptacle for trasferring the condensate and condensing medium from the former to the latter.

11. Apparatus for the wet grinding of cement-making and analogous solids, comprising storage receptacles respectively for the raw solids and for a grinding liquid which it is desired to recover and re-use; a mill having connections with said receptacles for transfer of materials from the latter to the mill for grinding of the solids therein in the presence of the liquid to produce a slurry; a storage receptacle receiving the slurry from said mill; means for receiving slurry from such storage receptacle, separating a portion of the liquid content thereof from the ground solids, and returning the separated liquid to the raw liquid storage receptacle; means for receiving the residue of the slurry from the separating means and heating it to vaporize the remaining liquid and thus dry the solids for further processing; condensing means connected to said heating means for receiving the vapors therefrom; means for supplying a mixture composed of portions of the grinding liquid and ground portions of the solids to said condensing means for direct condensing contact with the vapors therein; and means connecting said condensing means with the slurry storage receptacle for transferring the condensate and condensing medium from the former to the latter.

12. Apparatus for the wet grinding of cement-making and analogous solids, comprising storage receptacles respectively for the raw solids and for a grinding liquid which it is desired to recover and re-use; a mill having connections with said receptacles for transfer of materials from the latter to the mill for grinding of the solids therein in the presence of the liquid to produce a slurry; a storage receptacle receiving said slurry from the mill; means for receiving slurry from such storage receptacle, separating a portion of the liquid content thereof from the ground solids, and returning the separated liquid to the raw liquid storage receptacle; means for receiving the residue of the slurry from the separating means and heating it to vaporize the remaining liquid and thus dry the solids for further processing; condensing means connected to said heating means for receiving the vapors therefrom; means for supplying portions of the unground raw solids to said condensing means for direct condensing contact with the vapors therein; and means connecting said condensing means with the solids storage receptacle for transferring the condensate and condensing medium from the former to the latter.

References Cited in the file of this patent

UNITED STATES PATENTS

| | | |
|---|---|---|
| 1,721,686 | Boykin | July 23, 1929 |
| 1,893,522 | Oliver | Jan. 10, 1933 |
| 2,080,346 | Tainton | May 11, 1937 |
| 2,609,331 | Cheney | Sept. 2, 1952 |
| 2,611,714 | Witt | Sept. 23, 1952 |